(12) United States Patent
Hirate et al.

(10) Patent No.: US 10,589,777 B2
(45) Date of Patent: Mar. 17, 2020

(54) STEERING CONTROL APPARATUS

(71) Applicant: DENSO CORPORATION, Kariya, Aichi-pref. (JP)

(72) Inventors: Yosuke Hirate, Kariya (JP); Daiji Watanabe, Kariya (JP); Hisaya Akatsuka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 22 days.

(21) Appl. No.: 15/685,769

(22) Filed: Aug. 24, 2017

(65) Prior Publication Data

US 2018/0065657 A1 Mar. 8, 2018

(30) Foreign Application Priority Data

Aug. 25, 2016 (JP) .................................. 2016-164637

(51) Int. Cl.
*B62D 5/04* (2006.01)
*B62D 5/00* (2006.01)
*B62D 6/00* (2006.01)

(52) U.S. Cl.
CPC .......... *B62D 5/0463* (2013.01); *B62D 5/008* (2013.01); *B62D 5/0481* (2013.01); *B62D 6/00* (2013.01)

(58) Field of Classification Search
CPC . B62D 5/00; B62D 5/008; B62D 5/04; B62D 5/0463; B62D 5/0481; B62D 6/00
USPC .......................................................... 701/41
See application file for complete search history.

(56) References Cited

U.S. PATENT DOCUMENTS

| | | | |
|---|---|---|---|
| 6,450,287 B1* | 9/2002 | Kurishige | B62D 5/0466 180/443 |
| 2008/0164087 A1* | 7/2008 | Koyama | B62D 6/008 180/402 |
| 2009/0192679 A1* | 7/2009 | Kobayashi | B62D 5/0463 701/42 |
| 2011/0054742 A1* | 3/2011 | Yamashita | B62D 5/0463 701/43 |
| 2012/0197496 A1* | 8/2012 | Limpibunterng | B62D 1/286 701/42 |
| 2013/0190988 A1* | 7/2013 | Limpibunterng | B62D 5/008 701/42 |

(Continued)

FOREIGN PATENT DOCUMENTS

| | | |
|---|---|---|
| JP | 2008-013123 | 1/2008 |
| JP | 2014-201258 | 10/2014 |

(Continued)

*Primary Examiner* — Atul Trivedi
(74) *Attorney, Agent, or Firm* — Knobbe, Martens, Olson & Bear, LLP

(57) ABSTRACT

A motor controller of a steering control apparatus is configured to drive, based on an assist command and a tracking command, a motor to thereby generate assist torque and automatic steering torque. A state determiner of the steering control apparatus is configured to determine at least whether a driver's steering state is a biased steering state or a return steering state in accordance with a first parameter associated with steering torque based on the driver's steering, and a second parameter associated with an angular velocity of the motor. A ratio changer of the steering control apparatus is configured to change a ratio of the assist torque to the automatic steering torque in accordance with a determination result of the state determiner.

11 Claims, 12 Drawing Sheets

(56) References Cited

U.S. PATENT DOCUMENTS

| | | | | |
|---|---|---|---|---|
| 2014/0324294 A1* | 10/2014 | Champagne | ......... | B62D 5/0463 |
| | | | | 701/41 |
| 2015/0120140 A1* | 4/2015 | Kudo | .................... | B62D 5/0472 |
| | | | | 701/41 |
| 2015/0217801 A1* | 8/2015 | Takeda | .................... | B62D 6/008 |
| | | | | 701/42 |
| 2015/0232124 A1* | 8/2015 | Takeda | .................. | B62D 15/025 |
| | | | | 701/42 |
| 2015/0246686 A1* | 9/2015 | Takeda | .................... | B62D 6/008 |
| | | | | 701/41 |
| 2015/0274206 A1* | 10/2015 | Takeda | .................... | B62D 6/008 |
| | | | | 701/41 |
| 2015/0353126 A1* | 12/2015 | Chai | ....................... | B62D 6/008 |
| | | | | 701/42 |
| 2016/0001814 A1* | 1/2016 | Endo | .................... | B62D 5/0466 |
| | | | | 701/41 |
| 2016/0059885 A1* | 3/2016 | Tsubaki | ................ | B62D 5/0472 |
| | | | | 701/42 |
| 2016/0107679 A1* | 4/2016 | Kimura | ................ | B62D 5/0463 |
| | | | | 701/42 |
| 2016/0200354 A1* | 7/2016 | Kimura | ................ | B62D 5/0472 |
| | | | | 701/42 |
| 2018/0009473 A1* | 1/2018 | Akatsuka | ............ | B62D 5/0463 |
| 2018/0304917 A1* | 10/2018 | Michelis | .............. | B62D 5/0472 |

FOREIGN PATENT DOCUMENTS

| | | |
|---|---|---|
| JP | 2014-213781 | 11/2014 |
| JP | 2015-020604 A | 2/2015 |
| JP | 2015-033942 | 2/2015 |
| JP | 2015-093569 | 5/2015 |
| JP | 2015-151085 | 8/2015 |
| JP | 2015-168369 | 9/2015 |

* cited by examiner

STEERING CONTROL APPARATUS

CROSS REFERENCE TO RELATED APPLICATIONS

This application is based on and claims the benefit of priority from Japanese Patent Application 2016-164637 filed on Aug. 25, 2016, the disclosures of which are incorporated in its entirety herein by reference.

TECHNICAL FIELD

The present disclosure relates to steering control apparatuses for controlling the steering of a vehicle.

BACKGROUND

Known lane keeping technologies control a vehicle to keep the vehicle within a target lane in an automatic steering mode that automatically performs at least some of driver's steering operations.

For example, Japanese Patent Application Publication No. 2015-20604, which will be referred to as a published document, discloses a motor control apparatus in a vehicle control system. The motor control apparatus disclosed in the published document performs lane keeping control that generates automatic steering torque for a motor; the automatic steering torque causes the vehicle to travel along a target lane.

The motor control apparatus also performs power-steering control that generates assist torque for the motor to thereby reduce the load on driver's steering operations.

While executing the automatic steering, the motor control apparatus determines a driver's steering intervention upon detection of steering torque, and converts the steering torque into an intervening coefficient based on predetermined conversion information. Then, the motor control apparatus controls the automatic steering torque using the intervening coefficient. This control enables, even if there is a driver's intervention, the lane-keeping control to be carried out without driver's feeling of strangeness.

SUMMARY

While executing the automatic steering, the motor control apparatus of the published document determines a driver's steering intervention upon detection of steering torque. For this reason, it may be difficult to identify the state of a driver's steering intervention, such as biased steering or return steering. This therefore may make it difficult to give, to the driver, a steering feeling based on the state of the driver's steering intervention. Note that biased steering represents the state in which driver's torque is applied to the direction identical to the steering direction of the automatic steering, and return steering represents the state in which driver's torque is applied to the direction opposite to the steering direction of the automatic steering.

The present disclosure provides steering control apparatuses, each of which is capable of identifying the state of a driver's steering intervention, such as the biased steering or return steering, while executing automatic steering, making it possible to give, to the driver, steering feeling based on the state of a driver's steering intervention.

A steering control apparatus according to one aspect of the present disclosure includes an assist controller, a tracking controller a motor driver, a state determiner, and a ratio changer.

The assist controller is configured to perform a first control task that generates an assist command for generating assist torque. The assist torque reduces a load of a driver's steering of a steering wheel installed in a vehicle.

The tracking controller is configured to perform a second control task that generates a tracking command for generating automatic assist torque. The automatic assist torque causes a measurement value of a physical value associated with the steering to follow a target value for the physical value.

The motor driver is configured to drive, based on the assist command and the tracking command, the motor to thereby generate the assist torque and the automatic steering torque.

The state determiner is configured to determine at least whether a driver's steering state is a biased steering state or a return steering state in accordance with (1) A first parameter associated with steering torque based on the driver's steering (2) A second parameter associated with an angular velocity of the motor.

The ratio changer is configured to change a ratio of the assist torque to the automatic steering torque in accordance with a determination result of the state determiner.

According to this configuration, detecting the first parameter associated with the steering torque based on the driver's steering and the second parameter associated with the angular velocity of the motor enables whether the driver's steering state is the biased steering state or the return steering state to be identified. This makes it possible to selectively switch control tasks of the vehicle in accordance with the steering states, thus enabling steering feeling without strangeness to be given to the driver.

In addition, the present disclosure can be implemented as the above steering control apparatus, a system including the steering control apparatus, a program causing a computer to serve the computer as each means constituting the steering control apparatus, or a steering control method.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes embodiments of the present disclosure with reference to the accompanying drawings.

1. First Embodiment 1-1. Structure

Figure 1:
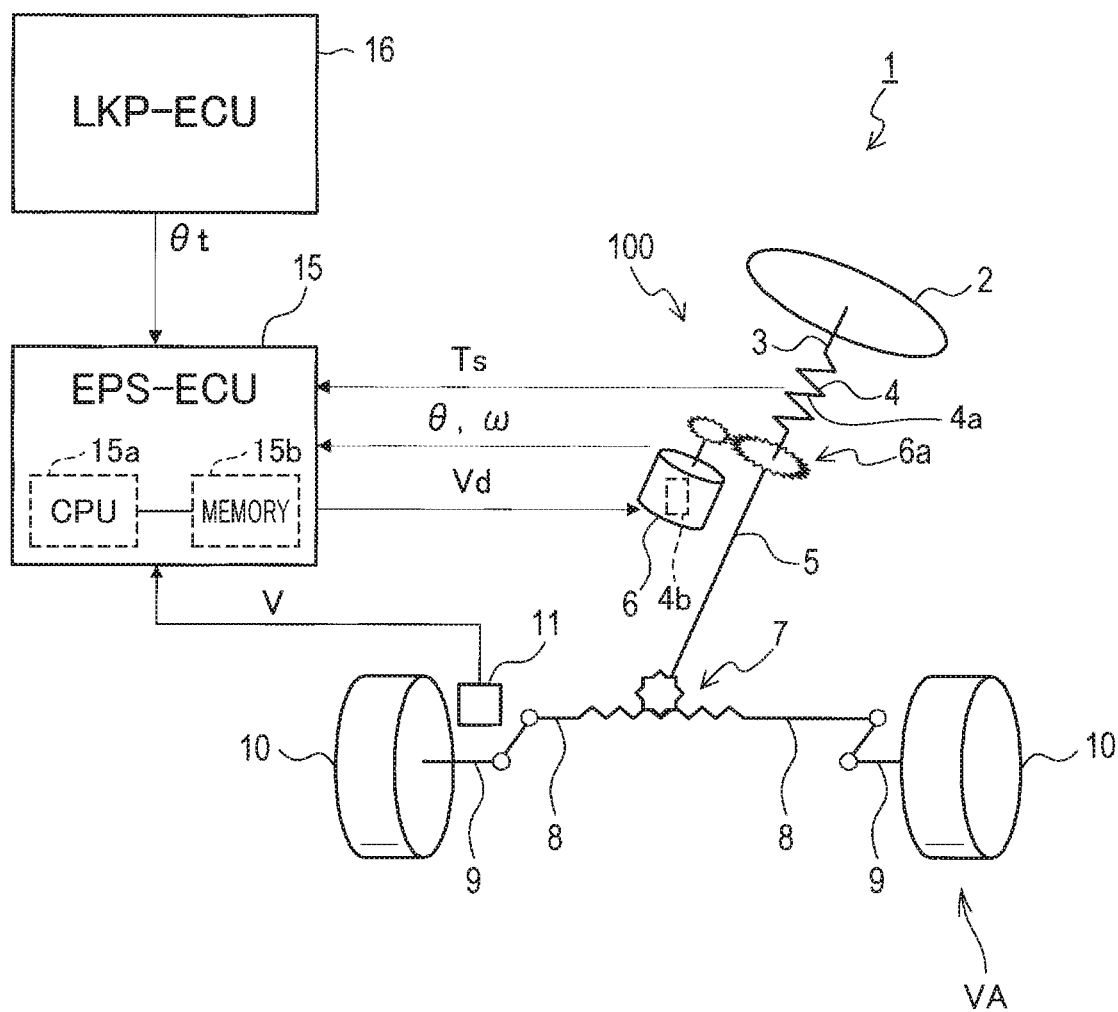
FIG. 1 is a block diagram illustrating the structure of a steering control apparatus.

An electric steering system 1 according to the first embodiment is installed in a vehicle VA, and configured to perform assist control and tracking control as illustrated in FIG. 1. The assist control represents control of assisting the driver's steering of the vehicle V using a motor 6. The tracking control, which is also called lane-keeping control, is to implement, using the motor 6, automatic steering of the vehicle VA along a target course set on the travelling lane of the vehicle VA.

The following describes the whole of the mechanism ranging from a steering wheel 2 of the vehicle VA to each tire 10 in the electric steering system 1; the mechanism will be referred to as a steering mechanism 100.

The steering wheel 2 is mounted to a first end of a steering shaft 3, and a second end of the steering shaft 3, which is opposite to the first end, is coupled to a first end of a torque sensor 4. A second end of the torque sensor 4, which is opposite to the first end, is coupled to a first end of an intermediate shaft 5 via a deceleration mechanism 6a described later. Hereinafter, the whole of the shaft member from the steering shaft 3 to the intermediate shaft 5 via the torque sensor 4 will also be collectively called a steering shaft.

The torque sensor 4 is a sensor for measuring steering torque Ts. Specifically, the torque sensor 4 includes a torsion bar 4a that couples the steering shaft 3 and the intermediate shaft 5, and measures a torsion angle of the torsion bar 4a as torque applied to the torsion bar 4a.

A motor 6 is coupled to the deceleration mechanism 6a, and operative to generate assist torque based on the assist control, and automatic steering torque based on the tracking control. The assist torque or the automatic steering torque is transferred to the intermediate shaft 5 via the decelerating mechanism 6a.

Specifically, the deceleration mechanism 6a is comprised of a worm gear mounted to the end of a rotating shaft of the motor 6, and a worm wheel mounted coaxially to the intermediate shaft 5 while being engaged with the worm gear. This configuration enables rotation of the rotating shaft of the motor 6, i.e. torque generated by the motor 6, to be transferred to the intermediate shaft 5. On the other hand, a rotation of the intermediate shaft 5 due to the driver's steering or reaction force from the road surface is transferred to the motor 6 via the deceleration mechanism 6a, so that the motor 6 is rotated.

The motor 6 consists of, for example, a brushless motor, and includes a rotation sensor 6b, such as a resolver, therein. The rotation sensor 6b outputs at least a rotational angle $\theta$ and an angular velocity $\omega$ of the motor. In place of the motor rotational angle $\theta$ and motor angular velocity $\omega$, a steering angle or a steering angler velocity of the vehicle VA can be used. Multiplying the motor rotational angle $\theta$ and motor angular velocity $\omega$ by a gear ratio of the decelerating mechanism 6a enables the steering angle and the steering angler velocity of the vehicle VA to be obtained.

A second end of the intermediate shaft 5 opposite to its first end coupled to the torque sensor 4 is coupled to a steering gear box 7.

The steering gear box 7 is configured as a gear mechanism comprised of a rack and a pinion. The pinion is mounted to the second end of the intermediate shaft 5, and is engaged with the rack. A driver's turning of the steering wheel 2 causes the intermediate shaft 5 to rotate, i.e. the pinion gear to rotate, resulting in the rack moving horizontally.

Tie rods 8 are mounted to the respective ends of the rack. The tie rods 8 are horizontally reciprocated together with the rack. This causes each of the tie rods 8 to push or pull a corresponding knuckle arm 9, thus enabling a corresponding tire 10 to turn in some other direction. This results in steering of the vehicle VA.

A vehicle speed sensor 11 is mounted to a predetermined portion of the vehicle VA and configured to measure a speed of the vehicle VA, which will be referred to as a vehicle speed V.

In the steering mechanism 100, a driver's steering operation of the steering wheel 2 is transferred to the gear mechanism 7 via the steering shaft, torsion bar of the torque sensor, and the steering gear box 7 via the steering shaft 3, the torque sensor 4, and the intermediate shaft 5. This causes rotation of the intermediate shaft 5 to be converted in the steering gear box 7 into the horizontal movement, i.e. right and left movement, of the tie rods 8. This movement of the tie rods 8 causes the right and left tires 10 to be steered.

The electric steering system 1 includes a lane-keeping electronic control unit (LKP-ECU) 16.

The LKP-ECU 16 operates based on power supplied from an unillustrated battery, and detects, based on an image in front of the vehicle captured by an unillustrated in-vehicle camera, the travelling lane or the position of the own vehicle VA on the travelling lane. The LKP-ECU 16 sets a target course for the vehicle VA in accordance with the detected position of the vehicle VA.

The LKP-ECU 16 sets a target angle $\theta t$ as a target value for the motor rotational angle $\omega$ or the steering angle in accordance with, for example, measurement values of the vehicle speed V and/or the steering angle; the target angle $\theta t$ is required for the vehicle VA to travel along the target course. Then, the LKP-ECU 16 outputs the target angle $\theta t$ to the EPS-ECU 15. Note that LKP stands for lane keeping. Specifically, the LKP-ECU 16 performs the lane-keeping control (LKP control) that causes the own vehicle VA to travel along the target course. Note that operations for setting the target angle θt in the LKP control are known, so that additional descriptions are omitted.

The electric steering system 1 also includes an electric power steering control apparatus 15, which will be referred to as an EPS-ECU 15.

The EPS-ECU 15 operates based on power supplied from the unillustrated in-vehicle battery. The EPS-ECU 15 calculates a final command TL in accordance with the target angle θt, the steering torque Ts, the motor rotational angle θ of the motor 6, the motor angular velocity ω, and the vehicle speed V measured by the vehicle speed sensor 11; the final command TL is based on the sum of an assist command AC and a tracking command TC. Note that EPS stands for electric power steering. Specifically, the EPS-ECU 15 performs control of assisting the driver's operation of the steering wheel 2 based on electrical power. The target angle θt is obtained by the LKP-ECU 16. The steering torque Ts is measured by the torque sensor 4. The assist command AC represents a command current value required to generate assist torque that assist the driver's steering operation of the steering wheel 2. The tracking command TC represents a current command value required to generate automatic steering torque for the LKP control.

The EPS-ECU 15 applies a drive voltage Vd based on the final command TL to the motor 6, thus generating the assist torque and the automatic steering torque.

That is, the EPS-ECU 15 controls the motor 6 based on the drive voltage Vd to thereby control the steering characteristics of the own vehicle AV, thus controlling the steering mechanism 100 driven by the motor 6. The EPS-ECU 15 is configured to perform control of the motor 6, i.e. control of the steering mechanism 100 every predetermined period in order to ensure a level of responsivity required for the tracking control, i.e. the lane-keeping control, to thereby update a drive command DC every predetermined period. The predetermined period is set to a value within the range from, for example, several hundred microseconds (μs) to several hundred milliseconds (ms) inclusive. Any value within the range can be used for the predetermined period as long as the lane-keeping control can be carried out without any problems. Note that, although not illustrated, the EPS-ECU 15 applies, based on the drive command DC, three-phase alternating-current voltages to the motor 6 as the drive voltage Vd if the motor 6 is a three-phase motor.

The EPS-ECU 15 is mainly comprised of a known microcomputer including a CPU 15*a* and a memory 15*b* comprised of semiconductor memories, such as a RAM, a ROM, and a flash memory.

The CPU 15*a* runs programs stored in a non-transitory storage, thus implementing various functions of the EPS-ECU 15. In this example, the memory 15*b* corresponds to the non-transitory storage medium. Running the programs enable methods corresponding to the respective programs to be carried out.

Figure 2:
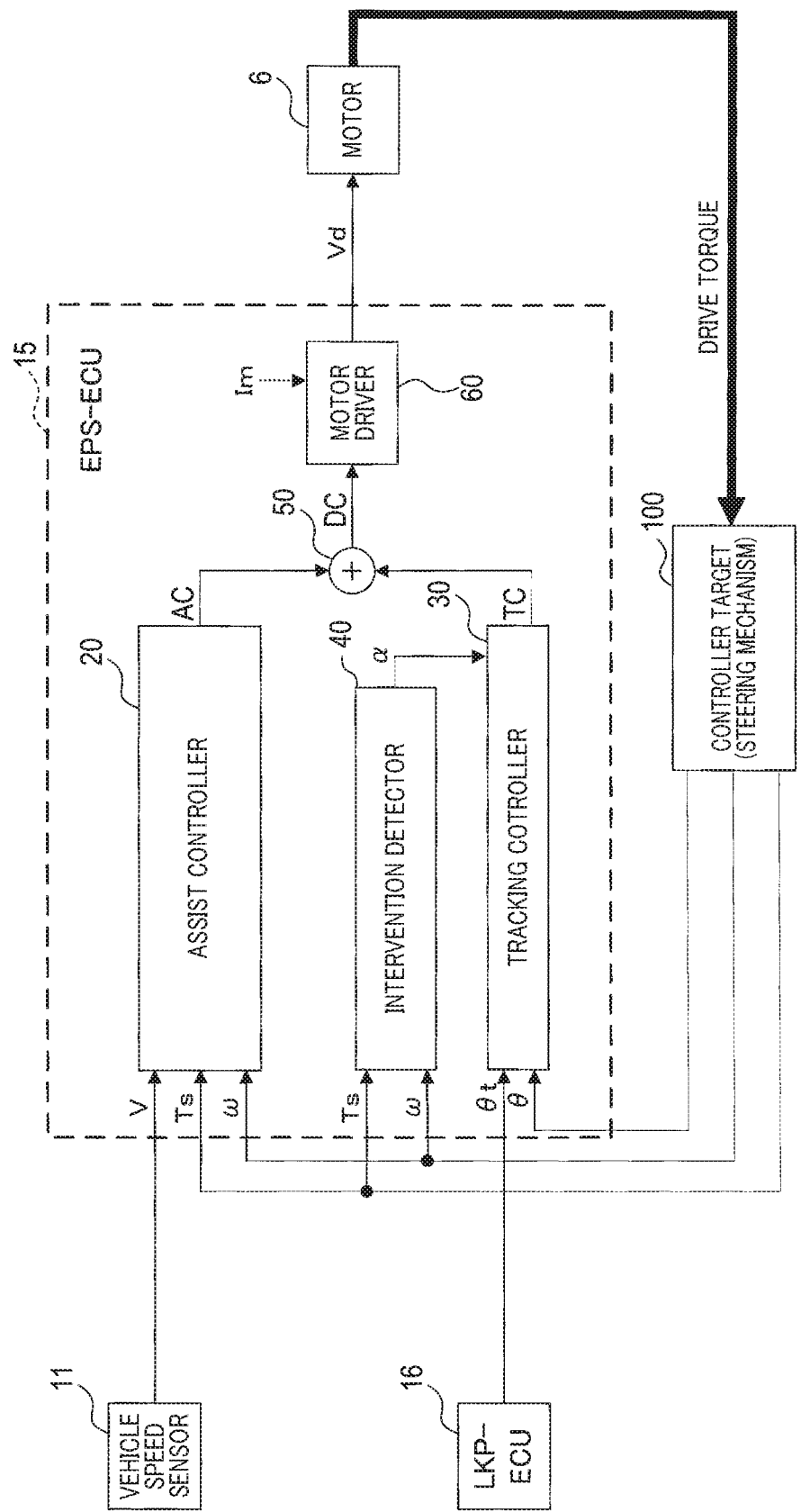
FIG. 2 is a block diagram illustrating the structure of an ECU.

Specifically, as illustrated in FIG. 2, the EPS-ECU 15 functions as an assist controller 20, a tracking controller 30, an intervention detector 40, an adder 50, and a motor driver 60 described later. Note that Note that a single microcomputer or a plurality of microcomputers can constitute the EPS-ECU 15. The adder 50 is operative to add the assist command AC and the tracking command TC to thereby generate the drive command DC serving as a current command for driving the motor. The elements constituting the EPS-ECU 15 is not be limited to the above software units. At least one of the elements can be implemented as at least one hardware element. For example, if the above various functions are implemented by hardware electronic circuits, these electronic circuits can be implemented by a combination of digital circuits including logic gates, analog circuits, or digital/analog hybrid circuits. Note that the EPS-ECU 15 corresponds to a steering control apparatus according to the present disclosure.

The motor driver 60 applies the drive voltage Vd based on the drive command DC to the motor 6 to thereby apply, to the steering shaft, assist torque and automatic steering torque that correspond to the drive command DC.

Specifically, the motor driver 60 performs feedback control of the drive voltage Vd to cause a value of current Im flowing in the motor 6 based on the drive voltage Vd to follow a target current value defined by the drive command DC, thus applying suitable torque to the steering shaft. Because such a motor driver 60 is known in, for example, Japanese Patent Application Publication No. 2013-52793, the detailed descriptions of the motor driver 60 can be omitted. The disclosure of this Japanese Patent Application Publication No. 2013-52793 is incorporated entirely herein by reference.

The assist controller 20 calculates the assist command AC as a function of the steering torque Ts, the motor angular velocity ω, and the vehicle speed V; the assist command AC represents a current command value required to generate assist torque. Note that the assist torque is to assist the driver's steering operation of the steering wheel 2 to thereby cause the driver to have a first feeling depending on reaction force and load from the road surface and a second feeling depending on the steering conditions.

For example, the assist controller 20 calculates, based on the steering torque Ts and the vehicle speed V, a fundamental assist value for causing the driver to have the first feeling depending on the reaction force from the road surface. Then, the assist controller 20 calculates, based on the steering torque Ts and the motor angular velocity ω, an assist compensation value depending on the steering conditions. Then, the assist controller 20 adds the assist compensation value to the fundamental assist value, thus generating the assist command AC.

Note that the assist controller 20 can use one of known methods for calculating the assist command AC.

The intervention detector 40 is configured to detect a driver's intervening operation to the tracking control, i.e. lane-keeping control.

Specifically, the intervention detector 40 reads the steering torque Ts and motor angular velocity ω, and outputs an intervening coefficient α based on the steering torque Ts and the motor angular velocity ω. The intervening coefficient α represents at least one of (1) The degree of driver's intervention to control carried out by the tracking controller 30 described later (2) The degree of intervening based on the automatic steering of for example the electric steering system 1 to control carried out by the assist controller 30; the control carried out by the assist controller 30 is associated with generation of the target value The intervention detector 40 can cause the steering torque Ts to pass through a low-pass filter to thereby eliminate, from the steering torque Ts, noise, such as road-surface disturbance superimposed on the steering torque Ts, except for the driver's intervening operation. Note that the detailed operations of the intervention detector 40 will be described later.

Figure 3:
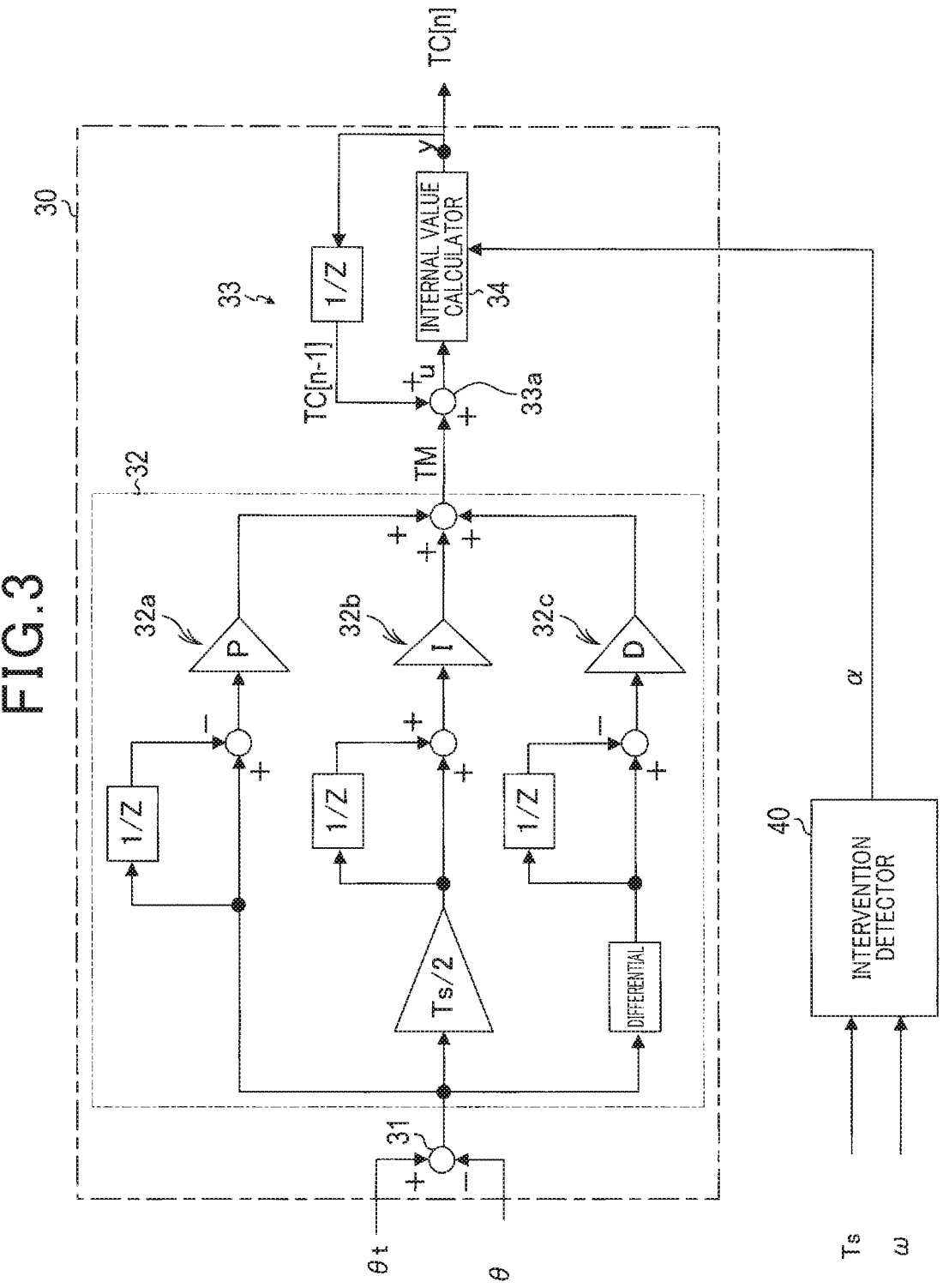
FIG. 3 is a block diagram illustrating the structure of a tracking control computing unit.

Referring to FIG. 3, the tracking controller 30 periodically generates, based on the motor rotational angle θ and the target angle θt, the tracking command TC; the tracking command TC represents a current command value for generating automatic steering torque required to cause the motor rotational angle θ to follow the target angle θt.

Specifically, the tracking controller 30 includes a subtractor 31, a characteristic determiner 32, an integrator 33, and an internal value calculator 34.

The subtractor 31 calculates the deviation of the motor rotational angle θ relative to the target angle θt.

The characteristic determiner 32 includes a first adder 32a, a second adder 32b, and a third adder 32a. The first adder 32a adds a proportional gain to the deviation calculated by the subtractor 31. The second adder 32b adds an integral gain to the deviation calculated by the subtractor 31. The third adder 32a adds a differential gain to the deviation calculated by the subtractor 31.

Adding the proportional gain, integral gain, and differential gain to the deviation determines control characteristics of the tracking control.

The integrator 33 integrates an integral target value TM as the output of the characteristic determiner 32.

The internal value calculator 34, which serves as, for example, a proportional changer, changes, based on the intervening coefficient α, an internal value used for the operations of the tracking controller 30 to correspondingly change the tracking command TC. Note that the set of the characteristic determiner 32 and the integrator 33 is a known circuit that implements a control structure based on mathematical expressions. The mathematical expressions are obtained by bilinear transforming usual PID-control mathematical expressions in order to discretize the usual PID-control mathematical expressions.

If a current value of the tracking command TC output from the tracking controller 30 is referred to as TC[n] where n is a natural number equal to or more than 2, the internal value calculator 34 is configured to (1) Change the output, which is referred to as change target u, of the adder 33a that adds the integral target TM and the previous value TC[n−1]

(2) Output a changed value y such that the changed output value y matches with the tracking command TC[n]

Note that TC[n−1] upon the first tracking command TC[n=1] being output is set to a predetermined value of, for example, zero.

Figure 4:
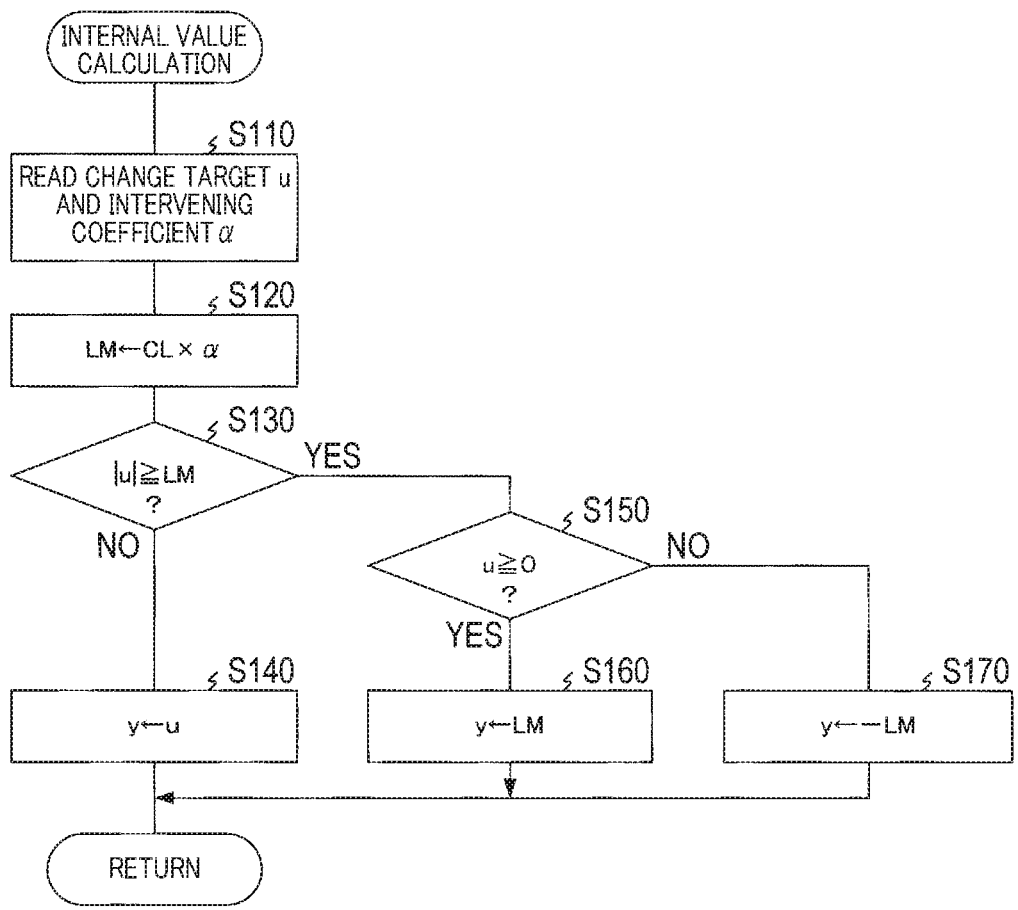
FIG. 4 is a flowchart illustrating an internal value calculating routine carried out by an internal value calculator.

The following describes an internal value calculation routine carried out by the internal value calculator 34 in accordance with a flowchart illustrated in FIG. 4. Not that reference character S represents a step.

In S110, the internal value calculator 34 reads the change target u as the output of the subtractor 31 and the intervening coefficient α as the output of the intervention detector 40.

In S120, the internal value calculator 34 multiplies a predetermined upper limit CL for the tracking command by the intervening coefficient α to thereby calculate a guard value LM. Note that the upper limit CL is set to, for example, a rated current value of the motor 6.

In S130, the internal value calculator 34 determines whether the absolute value |α| of the change target u is equal to or more than the guard value LM. That is, the internal value calculator 34 determines whether the change target u lies outside an allowable range of the tracking command TC defined from −LM to +LM inclusive. The boundary values of the allowable range are ±LM.

Upon determination that the change target u lies within the allowable range in S130, the internal value calculator 34 sets the change target u as the output y without any calculations in S140.

Otherwise, upon determination that the change target u lies outside the allowable range in S130, the internal value calculator 34 determines whether the change target u is a non-negative value in S150.

Upon determination that the change target u is a non-negative value, the internal value calculator 34 sets the guard value LM, which is the upper limit of the allowable range, as the output y in S160.

Otherwise, upon determination that the change target u is a negative value in S150, the internal value calculator 34 sets the negative guard value −LM, which is the lower limit of the allowable range, as the output y in S170.

Specifically, an increase of the absolute value |u| of the change target over the allowable range causes the tracking command TC to be limited to the guard value +LM or −LM of the allowable range. Because the LM is obtained by multiplying the upper limit CL of the tracking command by the intervening coefficient α and the upper limit CL is a constant value, the tracking command TC decreases with a decrease of the intervening coefficient α.

1-2. Operation

<Intervention Detector>

Figure 5:
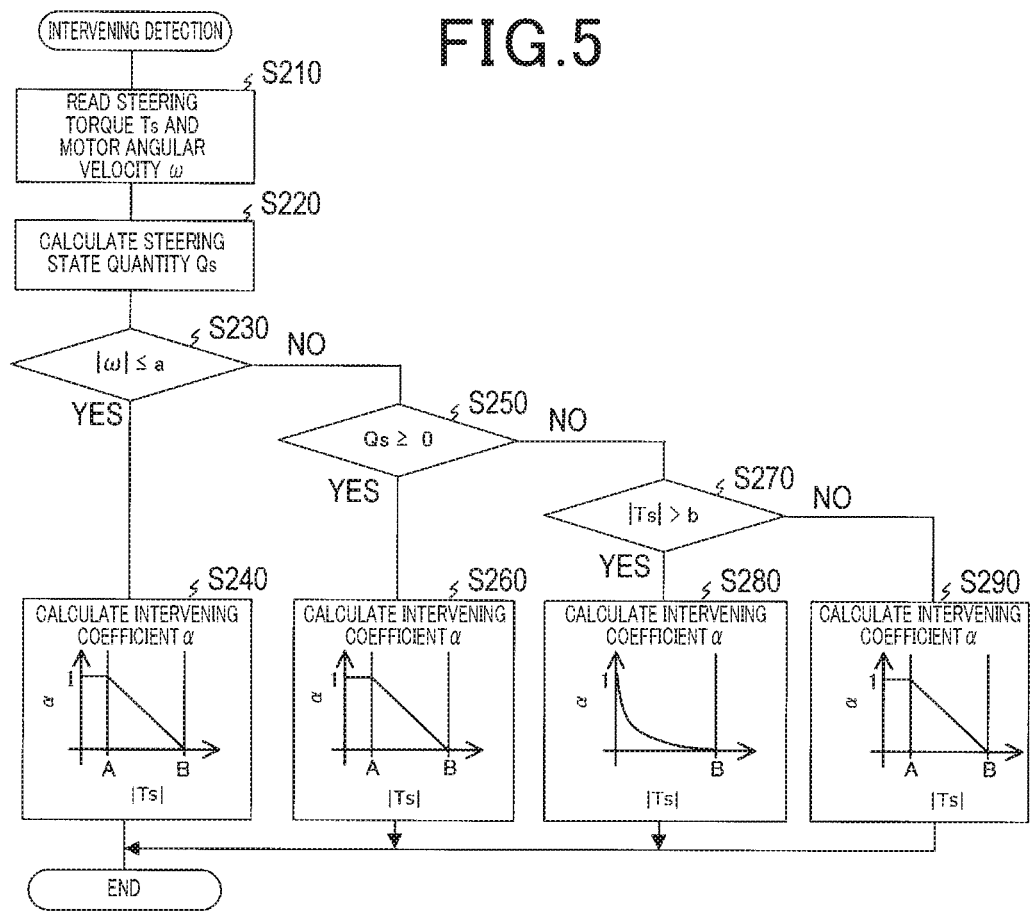
FIG. 5 is a flowchart illustrating an intervening detection routine carried out by an intervention detector.

The following describes the flow of an intervening detection routine carried out by the intervention detector 40 with reference to FIG. 5.

Note that the CPU 15a runs a program corresponding to the intervening detection routine to thereby execute the intervening detection routine in a predetermined period.

In S210, the intervention detector 40 reads the steering torque Ts and the motor angular velocity ω.

In S220, the intervention detector 40 multiplies the steering torque Ts and the motor angular velocity ω with each other to thereby calculate a steering state quantity Qs. Note that each of the steering torque Ts and the motor angular velocity ω is a positive value upon turning rotation of the steering wheel 2 in the right direction, and a negative value upon turning of the steering wheel 2 in the left direction Specifically, a central position of the steering wheel 2 is defined as a position at which the steering torque Ts becomes zero. The steering torque Ts is a positive value upon right-hand turning of the steering wheel 2 relative to the central position, and is a negative value upon left-hand turning of the steering wheel 2 relative to the central position. The central position is set to a position at which the vehicle VA is travelling straight upon the tires being gripped in a normal travelling state. The central position is set to a direction to which the tires slide sideways upon the vehicle VA spinning due to oversteering. If the absolute value of each of the steering torque Ts and the motor angular velocity ω is equal to or greater than a predetermined value, each of the steering torque Ts and the motor angular velocity ω is converted to +1 upon the corresponding value of the steering torque Ts and the motor angular velocity ω being positive or −1 upon the corresponding value of the steering torque Ts and the motor angular velocity ω being negative. Thereafter, the converted values of the steering torque Ts and the motor angular velocity ω are multiplied with each other, so that the steering state quantity Qs is calculated. That is, the steering state quantity Qs takes a value within the range from −1 to +1 inclusive.

In S230, the intervention detector 40 determines whether the absolute value |ω| of the motor angular velocity ω is equal to or lower than an angular velocity threshold α. Note that the angular velocity threshold α is a predetermined value of the motor angular velocity ω.

Upon determination that the absolute value |ω| of the motor angular velocity ω is equal to or lower than the angular velocity threshold α in S230, the intervention detector 40 determines that the steering state is a fixed steering state. The fixed steering state represents a state in which the driver holds the steering wheel 2 without moving in the right or left direction.

Upon determination that the steering state is the fixed steering state (YES in S230), the intervention detector 40 calculates a value of the intervening coefficient α, which corresponds to both the absolute value |Ts| of the current steering torque Ts and the fixed steering state, using a first transformation map prepared for the fixed steering state; the first transformation map shows the relationship between the absolute value |Ts| of the current steering torque Ts and the intervening coefficient α in S240. Thereafter, the intervention detector 40 terminates the intervening detection routine. Note that maps described in the first embodiment each show information about the correlations between plural variables; the information has a desired format, such as a table format, a mathematical expression format, or a program format.

Otherwise, upon determination that the absolute value |ω| of the motor angular velocity ω is higher than the angular velocity threshold α in S230, the intervention detector 40 determines whether the steering state quantity Qs is equal to or higher than zero in S250.

Upon determination that the steering state quantity Qs is equal to or higher than zero (YES in S250), the intervention detector 40 determines that the steering state is a biased steering state. That is, if the polarity of the steering torque Ts is identical to the polarity of the motor angular velocity ω so that the steering state quantity Qs is a positive value, the intervention detector 40 determines that the steering state quantity Qs is a value resulted from the driver's biased steering operation. Upon determining that the steering state is the biased steering state, the intervention detector 40 calculates a value of the intervening coefficient α, which corresponds to both the absolute value |Ts| of the current steering torque Ts and the biased steering state, using a second transformation map prepared for the biased steering state; the second transformation map shows the relationship between the absolute value |Ts| of the steering torque Ts and the intervening coefficient α in S260. Thereafter, the intervention detector 40 terminates the intervening detection routine.

Otherwise, upon determination that the steering state quantity Qs is lower than zero (NO in S250), the intervention detector 40 determines whether the absolute value |Ts| of the current steering torque Ts is higher than a torque threshold b in S270. The torque threshold b is a predetermined threshold value of the steering torque Ts.

Upon determination that the absolute value |Ts| of the current steering torque Ts is higher than the torque threshold b (YES in S270), the intervention detector 40 determines that the steering state is a return steering state. Upon determining that the steering state is the return steering state, the intervention detector 40 calculates a value of the intervening coefficient α, which corresponds to both the absolute value |Ts| of the current steering torque Ts and the return steering state, using a third transformation map prepared for the return steering state; the third transformation map shows the relationship between the absolute value |Ts| of the steering torque Ts and the intervening coefficient α in S280. Thereafter, the intervention detector 40 terminates the intervening detection routine.

Otherwise, upon determination that the absolute value |Ts| of the current steering torque Ts is equal to or lower than the torque threshold b (NO in S270), the intervention detector 40 determines that the steering state is a hands-free steering state.

Upon determining that the steering state is the hands-free steering state, the intervention detector 40 calculates a value of the intervening coefficient α, which corresponds to both the absolute value |Ts| of the current steering torque Ts and the hands-free steering state, using a fourth transformation map prepared for the hands-free steering state; the fourth transformation map shows the relationship between the absolute value |Ts| of the steering torque Ts and the intervening coefficient α in S290. Thereafter, the intervention detector 40 terminates the intervening detection routine.

The intervention detector 40 supplies the calculated intervening coefficient α to the tracking controller 30.

Note that the operations in steps S210 to S290 correspond to operations by a state determiner. In particular, the operations in step S240, S260, S280, and S290 correspond to operations by an intervening calculator.

The first to fourth transformation maps can be stored in the memory 15b or incorporated in the program corresponding to the intervening detection routine.

The following describes the first, second, third, and fourth transformation maps respectively corresponding to the fixed steering state, biased steering state, return steering state, and hand-free state. Note that, hereinafter, the absolute value |Ts| of the steering torque Ts is used as a parameter for each of the transformation maps, but a value of the steering torque Ts itself can be used as a parameter for each of the transformation maps. In this modification, each transformation map has symmetric characteristics across the axis at which the steering torque Ts is zero.

The first transformation map used when the steering state is the fixed steering state determined by the intervention detector 40, that is, the first transformation map corresponding to the fixed steering state used in S240 is designed as follows.

The first transformation map is configured such that the intervention detector 40 outputs (1) The intervening coefficient α being equal to 1 upon the absolute value |Ts| being equal to or lower a first threshold A (|Ts|≤A)

(2) The intervening coefficient α being equal to 0 upon the absolute value |Ts| being equal to or higher a second threshold B (|Ts|≥B)

(3) The intervening coefficient α monotonically decreasing within the range from 1 to 0 with an increase of the absolute value |Ts| upon the absolute value |Ts| being higher than the first threshold A and lower than the second threshold B (A<|Ts|<B)

Note that the second threshold B is set to be higher than the first threshold A.

That is, the intervention detector 40 generates the intervening coefficient α such that, the higher the absolute value |Ts| of the steering torque Ts is, i.e. the larger the degree of the driver's steering intervening is, the lower the intervening coefficient α is. This enables the intervening coefficient α to decrease, so that the tracking command is reduced, making it possible to reduce load on the driver.

If the driver unintentionally touches the steering wheel as an example so that the absolute value |Ts| is within a dead zone that is equal to or lower the first threshold A, the intervention detector 40 outputs the intervening coefficient α being equal to 1. This prevents the driver's unintentional touch to the steering wheel from being erroneously detected as an intervening operation.

The second threshold B can be for example set to a value at which a value of the steering torque Ts generated based on a driver's unintentional steering operation is reliably determined as a driver's unintentional steering operation. If the absolute value |Ts| is higher than the first threshold A and lower than the second threshold B (A<|Ts|<B), it is possible to decrease the intervening coefficient α in another form, such as a quadric form or a known form other than the linear form.

The second transformation map used when the steering state is the biased steering state determined by the intervention detector 40, that is, the second transformation map corresponding to the biased steering state used in S260 is designed to be similar to the first transformation map corresponding to the fixed steering state used in S240.

Specifically, the second transformation map corresponding to the biased steering state has the dead zone where the absolute value |Ts| is equal to or lower the first threshold A. This prevents a driver's unintentional touch to the steering wheel from being erroneously detected as an intervening operation, which is similar to the fixed steering state.

The third transformation map used when the steering state is the return steering state determined by the intervention detector 40, that is, the third transformation map corresponding to the return steering state used in S280 is designed as follows.

The third transformation map is configured such that the intervention detector 40 outputs (1) The intervening coefficient α being equal to 1 upon the absolute value |Ts| being zero (|Ts|=0)

(2) The intervening coefficient α being equal to 0 upon the absolute value |Ts| being equal to or higher the second threshold B (|Ts|≥B)

(3) The intervening coefficient α increasing exponentially or inversely with a decrease of the absolute value |Ts| upon the absolute value |Ts| being higher than 0 and lower than the second threshold B (0<|Ts|<B)

The fourth transformation map used when the steering state is the hands-free steering state determined by the intervention detector 40, that is, the fourth transformation map corresponding to the hands-free steering state used in S290 is designed to be similar to the first transformation map corresponding to the fixed steering state used in S240.

Specifically, the fourth transformation map corresponding to the hands-free steering state has the dead zone where the absolute value |Ts| is equal to or lower the first threshold A. This prevents a driver's unintentional touch to the steering wheel from being erroneously detected as an intervening operation, which is similar to the fixed steering state.

As described above, it is sufficient that at least the first and third transformation maps are stored in the memory 15*b* as the first to fourth transformation maps.

1-3. Advantageous Effect

As described above, the intervention detector 40 is configured to selectively switch one of the first to fourth transformation maps, i.e. the first transformation map and the third transformation map, in accordance with the driver's steering state of the steering wheel 2 and to calculate the intervening coefficient α based on the driver's steering state of the steering wheel 2 using the selected one of the first to fourth transformation maps. This configuration enables the driver's steering state of the steering wheel 2, such as the biased steering state or the return steering state, to be identified in accordance with the measured steering torque Ts and motor angular velocity ω. Selecting one of the control tasks of the vehicle VA in accordance with the identified driver's steering state makes it possible to give, to the driver, steering feeling without strangeness.

For example, the steering control apparatus according to the first embodiment enables the return steering state and the hands-free steering state, which are the driver's steering states of the steering wheel 2, to be distinguished from each other.

Specifically, the torque threshold b is established for the steering torque Ts according to the first embodiment. The steering control apparatus determines that the driver's steering state of the steering wheel 2 is the return steering state if the steering torque Ts is higher than the torque threshold b, and determines that the driver's steering state of the steering wheel 2 is the hand-free state if the steering torque Ts is equal to or lower than the torque threshold b. This configuration enables the return steering state and the hands-free steering state, which are the driver's steering states of the steering wheel 2, to be distinguished from each other.

The steering control apparatus according to the first embodiment has the third and fourth transformation maps corresponding to the respective return steering state and hand-free state as the driver's steering states of the steering wheel 2. This configuration balances (1) The driver's feeling, i.e. returned feeling, of the steering wheel 2 being more returned than the driver's intension in the return steering state (2) The tracking performance of the returning to the target course of the vehicle VA in the hands-free steering state of the steering wheel 2

The following specifically, describes the steering state quantity Qs, the tracking command TC, and the steering torque Ts when the driver's steering state is switched from the biased steering state to the return steering state or the hand-free state with reference to FIGS. 6 to 11.

Note that the horizontal axis of each of FIGS. 6 to 11 represents time, and the vertical axis of each of FIGS. 6 to 11 represents a corresponding one of the steering state quantity Qs, the tracking command TC, and the steering torque Ts. In addition, the driver performs the biased steering from 0 seconds to 2.5 seconds, and thereafter performs the return steering or hands-free steering state from 2.5 seconds.

Figure 6:
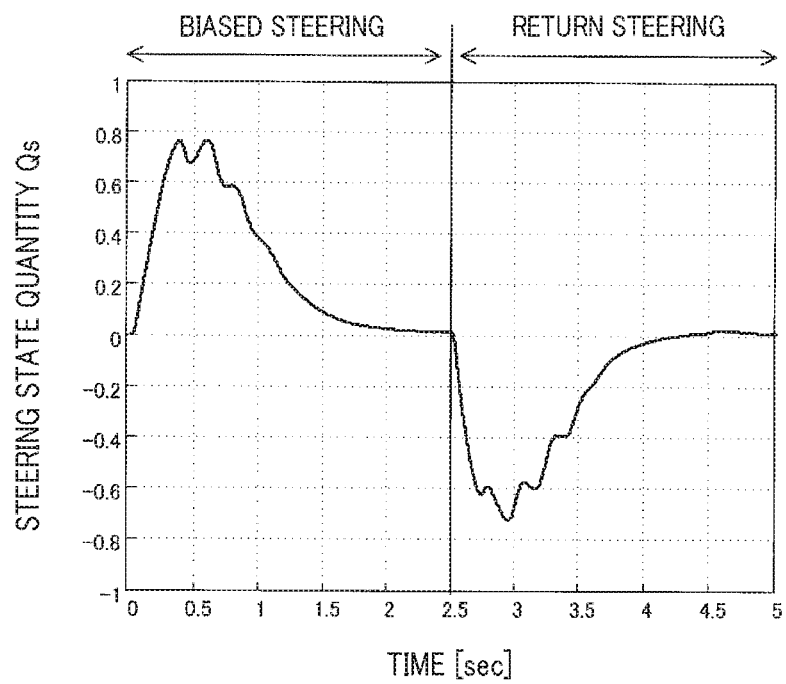
FIG. 6 is a graph illustrating change of a steering-state quantity upon biased steering and return steering being carried out.

The following describes the steering state quantity Qs when the steering state is changed from the biased steering state to the return steering state with reference to FIG. 6.

The steering state quantity Qs is positive from 0 seconds to 2.5 seconds during which the driver performs the biased steering. This is because the polarity of the steering torque Ts and the polarity of the motor angular velocity ω are identical to each other.

In contrast, the steering state quantity Qs is negative in the period after 2.5 seconds during which the driver performs the return steering. This is because the polarity of the steering torque Ts and the polarity of the motor angular velocity ω are different from each other.

The results show that the steering state quantity Qs is positive during the driver's biased steering, and is negative during the driver's return steering as described above.

Figure 7:
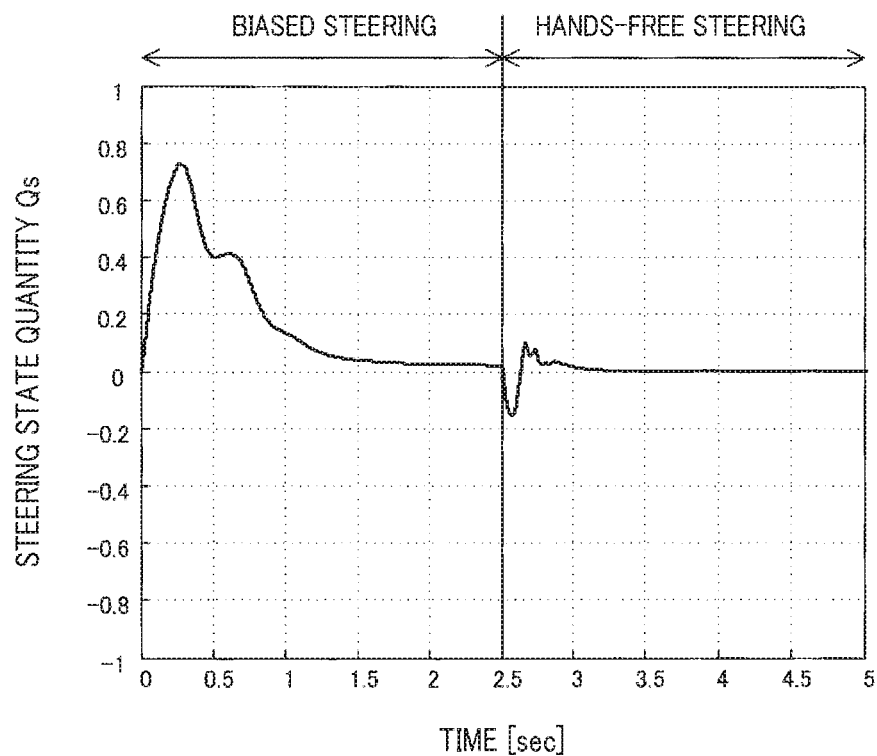
FIG. 7 is a graph illustrating change of the steering-state quantity upon biased steering and hands-free steering state being carried out.

Next, the following describes the steering state quantity Qs when the steering state is changed from the biased steering state to the hand-free steering state with reference to FIG. 7.

The steering state quantity Qs is positive from 0 seconds to 2.5 seconds during which the driver performs the biased steering.

In contrast, the absolute value of the steering state quantity Qs is stably maintained to be equal to or lower than a predetermined threshold.

In comparison to the result obtained by the driver's return steering as illustrated in FIG. 6, the magnitude of the absolute value of the steering state quantity Qs is smaller. This is because, when the driver's steering state is switched to the hands-free steering state so that the absolute value of the steering state quantity Ts becomes lower than the predetermined torque threshold, the absolute value of the steering state quantity Qs, which is obtained by multiplying the steering torque Ts and the motor angular velocity ω with each other, is stably maintained to be equal to or lower than the predetermined value.

Specifically, the first embodiment determines whether the absolute value of the steering torque Ts is equal to or lower than the predetermined torque threshold, making it possible to distinguish the hands-free steering state and the return steering state from each other.

Figure 8:
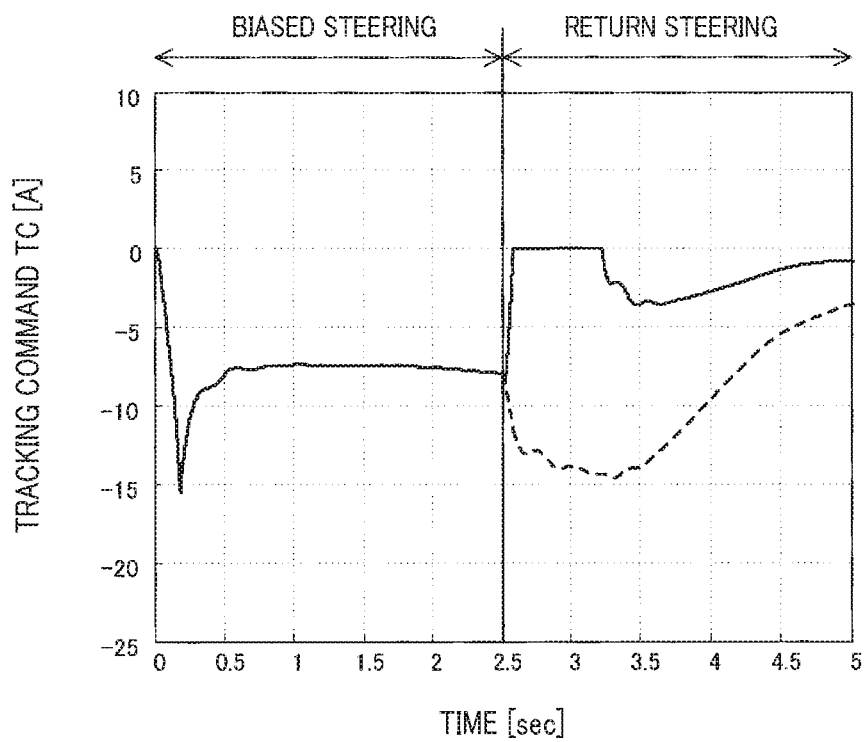
FIG. 8 is a graph illustrating change of a tracking command upon biased steering and return steering being carried out.
Figure 9:
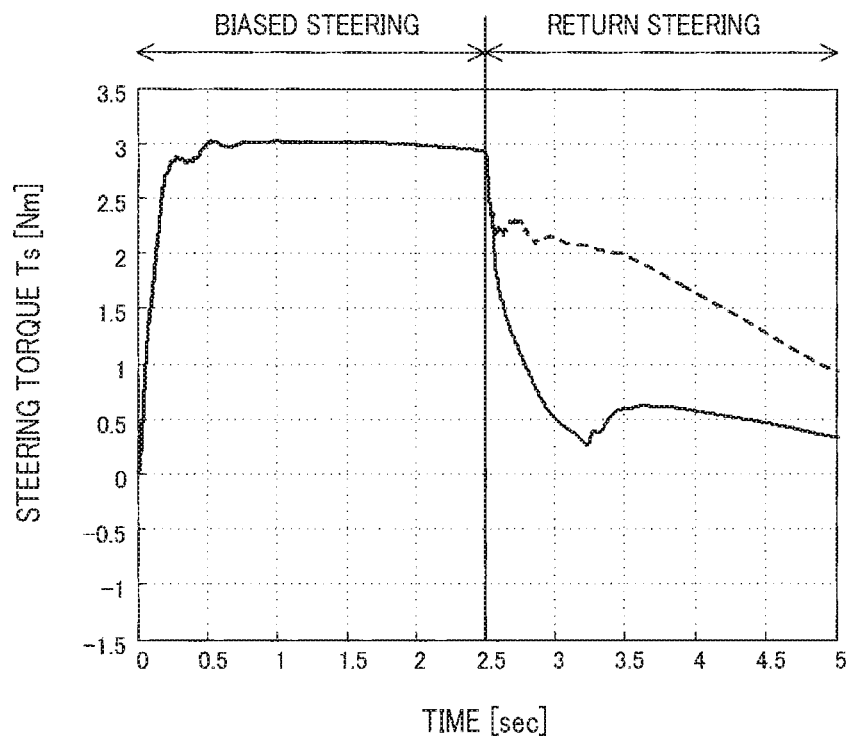
FIG. 9 is a graph illustrating change of steering torque upon biased steering and return steering being carried out.

The following describes the tracking command TC when the steering state is changed from the biased steering state to the return steering state with reference to FIG. 8. Note that, in each of the following FIGS. 8 to 11, the result of the tracking command TC obtained based on the above conventional art is illustrated by dashed lines, and the result of the tracking command TC obtained based on the first embodiment is illustrated by solid lines. As described above, the tracking command TC represents a current command value for generating automatic steering torque required to cause the motor rotational angle θ to follow the target angle θt.

The result of the tracking command TC obtained based on the conventional art and the result of the tracking command TC obtained based on the first embodiment are substantially identical to each other while the driver performs the biased steering from 0 seconds to 2.5 seconds.

In contrast, the absolute value of the tracking command TC based on the first embodiment is smaller than the absolute value of the tracking command TC based on the conventional art while the driver performs the return steering after 2.5 seconds. FIG. 8 illustrates that the tracking command TC based on the conventional art has negative values and has some larger absolute values. This shows that, in the conventional art, the automatic steering has a lot of influence on the driver's return steering in response to the tracking command TC, so that the driver has a feeling of the steering wheel 2 being forcibly returned.

In contrast, FIG. 8 illustrates that the absolute values of the tracking command TC based on the first embodiment are smaller than the corresponding absolute values of the tracking command TC based on the conventional art. The lower values of the tracking command TC based on the first embodiment in comparison to the conventional art result in the steering torque Ts based on the first embodiment being lower than the steering torque Ts based on the conventional art. This therefore gives, to the driver, lighter feeling of the steering wheel 2 being returned.

Figure 10:
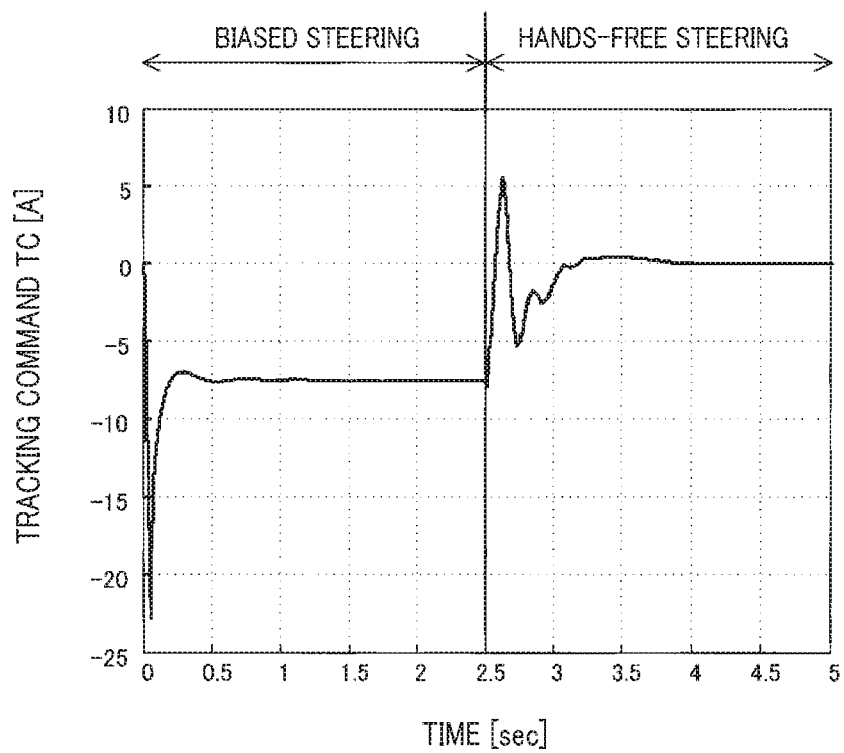
FIG. 10 is a graph illustrating change of the tracking command upon biased steering and hands-free steering state being carried out.
Figure 11:
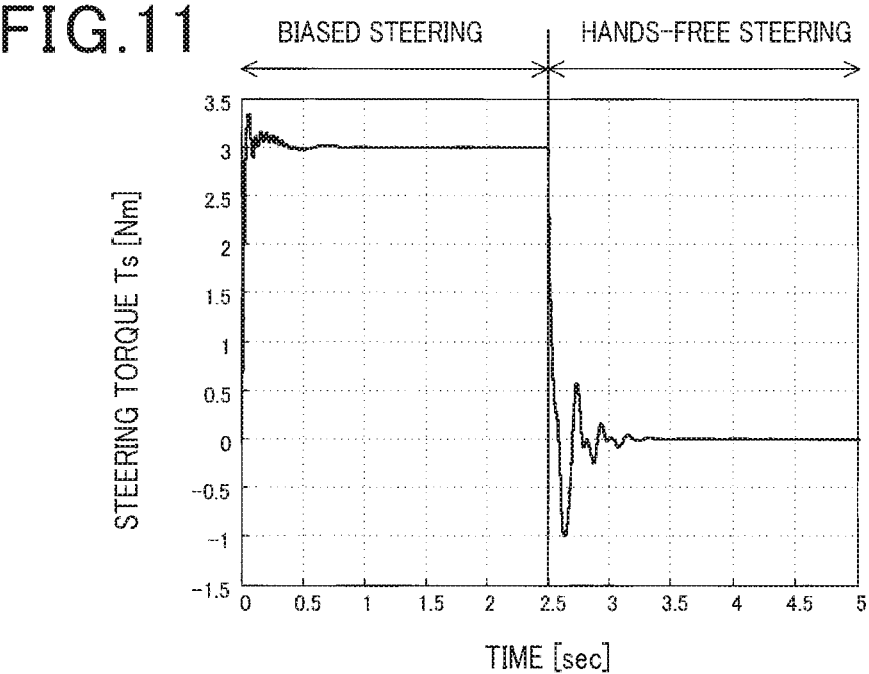
FIG. 11 is a graph illustrating change of the steering torque upon biased steering and hands-free steering state being carried out.

The following describes the tracking command TC when the steering state is changed from the biased steering state to the hands-free steering state with reference to FIG. 10. The result of the tracking command TC obtained based on the above conventional art is illustrated by dashed lines, and the result of the tracking command TC obtained based on the first embodiment is illustrated by solid lines.

The result of the tracking command TC obtained based on the conventional art and the result of the tracking command TC obtained based on the first embodiment are substantially identical to each other while the driver performs the hands-free steering after 2.5 seconds. This results in the steering torque Ts obtained based on the first embodiment being substantially identical to the steering torque Ts based on the conventional art. That is, the above results show that the tracking performance achieved by the first embodiment is substantially identical to the tracking performance achieved by the conventional art.

2. Second Embodiment 2-1. Different Point With Respect to First Embodiment

Because the basic structure of the second embodiment is substantially identical to the basic structure of the first embodiment, the following describes the different points. As to some elements in the second embodiment, which are identical to the corresponding parts in the first embodiment and assigned with the same reference characters, the second embodiment refers to the descriptions of the corresponding elements in the first embodiment.

Figure 12:
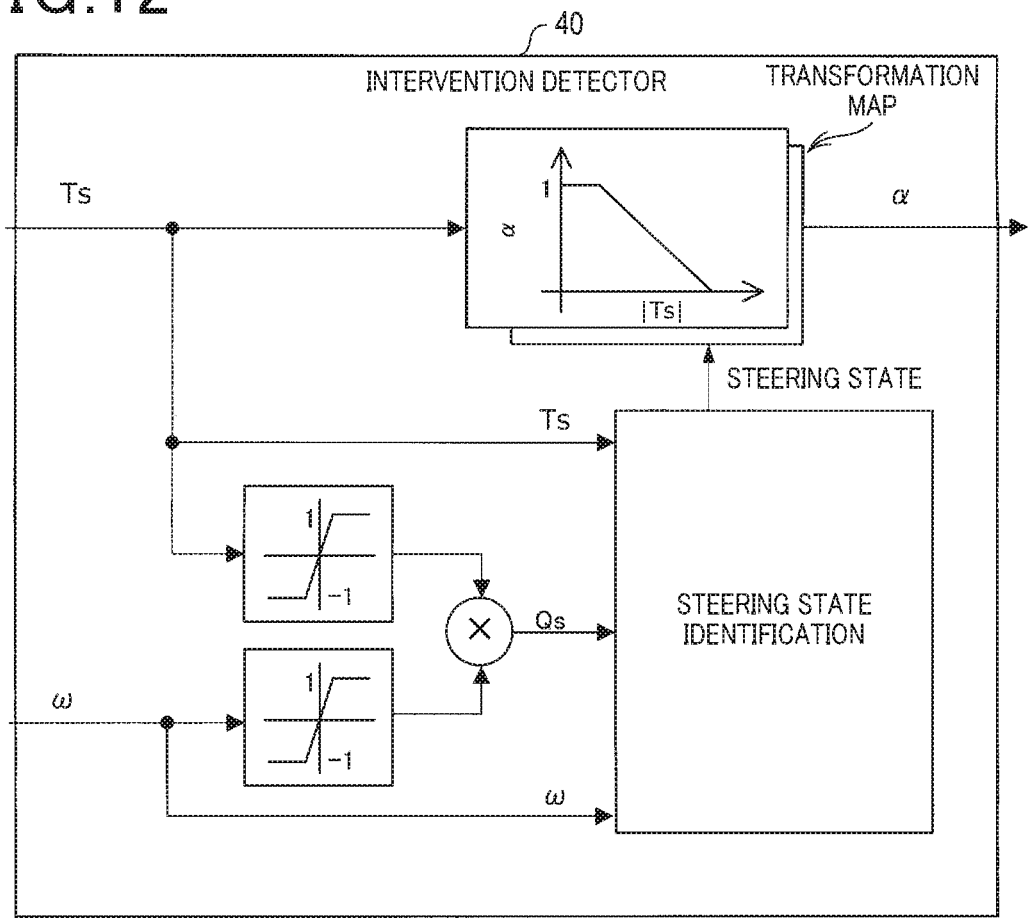
FIG. 12 is a diagram illustrating the structure of the intervention detector.

As illustrated in FIG. 12, the intervention detector 40 according to the first embodiment selectively switches one of the transformation maps respectively corresponding to the steering states to thereby calculate the intervening coefficient α.

Figure 13:
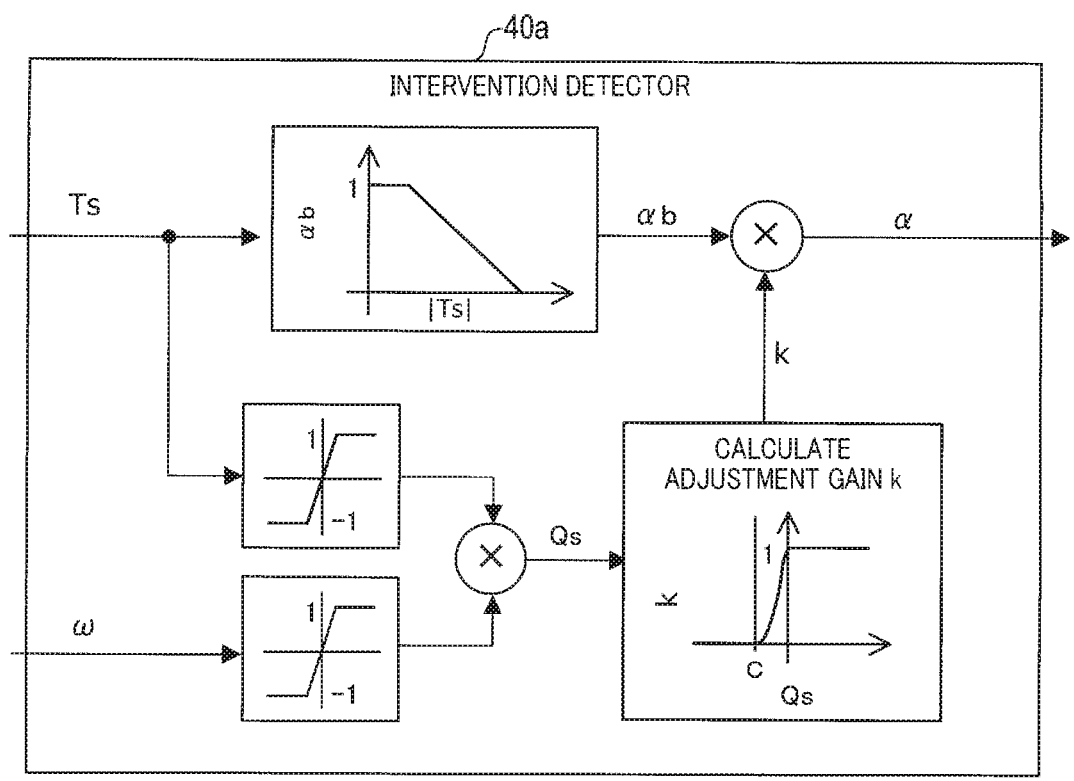
FIG. 13 is a diagram illustrating the structure of an intervention detector according to the second embodiment.

In contrast, as illustrated in FIG. 13, an intervention detector 40a according to the second embodiment is different from the intervention detector 40 according to the first embodiment in the following point that the intervention detector 40a multiplies an adjustment gain k corresponding to the steering state quantity Qs to an intervening coefficient base αb corresponding to the steering torque Ts to thereby calculate the intervening coefficient α. Note that the intervening coefficient base αb represents a value obtained based on a single transformation map in accordance with the steering torque Ts.

1-2. Operation

Figure 14:
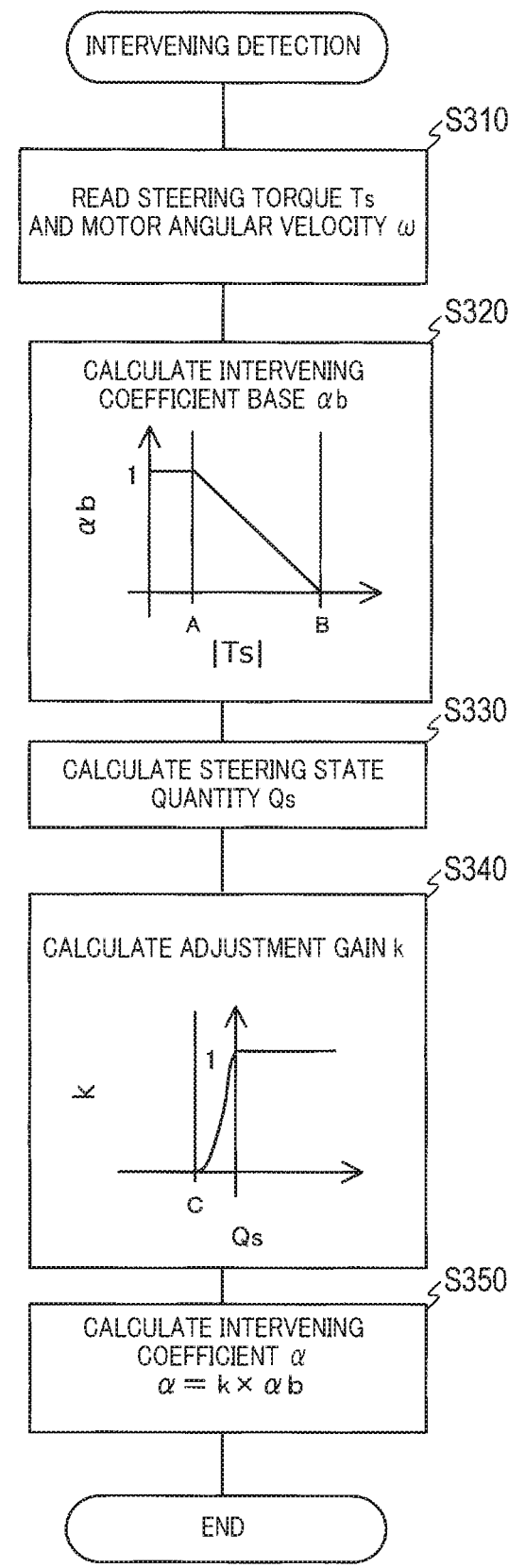
FIG. 14 is a flowchart illustrating an intervening detection routine carried out by the intervention detector according to the second embodiment.

The following describes, with reference to FIG. 14, an intervening detection routine according to the second embodiment, which is carried out by the intervention detector 40a in place of the intervening detection routine according to the first embodiment illustrated in FIG. 5. Note that, because the operations in S310, S320, and S330 are identical to the respective operations in S210, S240, and S220 in FIG. 5, the descriptions of the operations in S310, S320, and S330 are partly simplified.

In S310, the intervention detector 40a reads the steering torque Ts and the motor angular velocity ω.

In S320, the intervention detector 40a calculates a value of the intervening coefficient base αb in accordance with a previously defined single transformation map and the steering torque Ts. Note that the transformation map used in S320 is identical to the first transformation map used in S240.

In S330, the intervention detector 40a obtains the steering state quantity Qs in accordance with the steering torque Ts and the motor angular velocity ω in the same manner as the operation in S220.

In S340, the intervention detector 40a calculates the adjustment gain k in accordance with the steering state quantity Qs and a previously defined gain transformation map. The gain transformation map shows the relationship between the steering state quantity and the adjustment gain k. The gain transformation map is configured to output the adjustment gain k being zero if the steering state quantity Qs is lower than a state threshold C that is a constant negative value, and output the adjustment gain k being 1 if the steering state quantity Qs is equal to or higher than zero. The gain transformation map can be stored in the memory 15*b* or incorporated in the program corresponding to the intervening detection routine.

If the steering state quantity Qs is equal to or higher than the state threshold C and lower than 0, the intervention detector 40*a* outputs the adjustment gain k such that the adjustment gain k increases from 0 to 1 with an increase of the steering state quantity Qs from the state threshold C to 0. That is, the intervention detector 40*a* generates the adjustment gain k based on the gain transformation map such that, the higher the state quantity Qs is, the mote the adjustment gain k increases. Note that the state threshold C is set to a value corresponding to the driver's return steering state if the steering state quantity Qc is lower than the state threshold C.

In S350, the intervention detector 40*a* multiplies the calculated adjustment gain k and the intervening coefficient base αb with each other, thus calculating the intervening coefficient α.

2-3 Advantageous Effect

The second embodiment described in detail above, which achieves the advantageous effects achieved by the first embodiment, further achieves the following advantageous effects.

The first embodiment needs plural transformation maps corresponding to the driver's four steering states of the steering wheel 2 as the transformation map for calculating the intervening coefficient α based on the steering torque Ts.

In contrast, the second embodiment, which is configured to multiply the intervening coefficient base αb and the adjustment gain k with each other to thereby calculate the intervening coefficient α, enables the number of transformation maps for calculating the intervening coefficient α. This results in the storage capacity of the memory 15*b* required for storing the transformation map(s) being reduced and in the transformation-map switching process being simplified, making it possible to reduce the processing load of the CPU 15*a*. In addition, because there is no need for switching one of the transformation maps to another, adjusting the adjustment gain k each time the driver's steering state of the steering wheel 2 is switched to another state prevents the intervening coefficient α from being rapidly changed. This prevents rapid change of steering feeling from being given to the driver.

3. Modifications

The embodiments of the present disclosure have been described, but the present disclosure is not limited to the above embodiments, and can be variously modified.

Upon it being determined by the intervention detector 40 that the driver's steering state is the biased steering state according to the first embodiment, the second transformation map prepared for the biased steering state and used in step S260 is identical to the transformation map prepared for the fixed steering state and used in step S240, but the second transformation map prepared for the biased steering state is not limited thereto.

Figure 15:
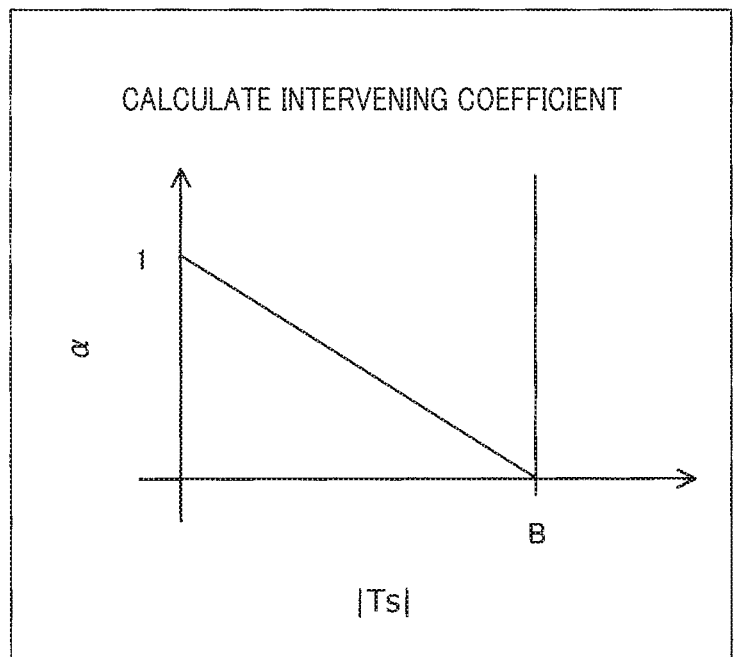
FIG. 15 is a graph illustrating a conversion map according to a modification.
Figure 16:
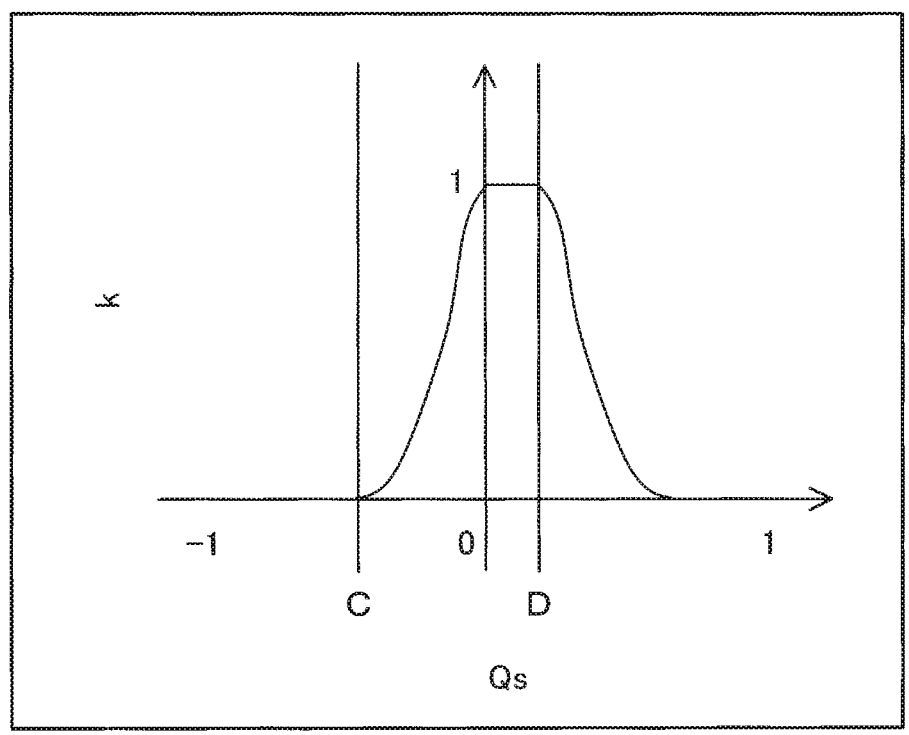
FIG. 16 is a graph illustrating the relationship between an adjustment gain and the steering-state quantity according to another modification.

For example, as illustrated in FIG. 15, the second transformation map can be designed as the following map. Specifically, the transformation map illustrated in FIG. 15 is configured such that the intervention detector 40 outputs 1. The intervening coefficient α being 1 upon the absolute value absolute value |Ts| of the current steering torque Ts is equal to or lower zero (|Ts|≤0)

2. The intervening coefficient α being 0 upon the absolute value absolute value |Ts| of the current steering torque Ts is equal to or higher than the second threshold B (|Ts|≥B)

3. The intervening coefficient α monotonically decreasing within the range from 1 to 0 with an increase of the absolute value |Ts| upon the absolute value |Ts| being higher than 0 and lower than the second threshold B (0<|Ts|<B)

That is, the intervention detector 40 generates the intervening coefficient α such that, the higher the absolute value |Ts| of the steering torque Ts is, i.e. the larger the degree of the driver's steering intervening is, the lower the intervening coefficient α is. The second transformation map illustrated in FIG. 15 has no dead zones as compared with the second transformation map used in step S240. This enables the intervening coefficient to decrease, so that the tracking command is reduced and therefore the automatic steering torque is reduced. This results in a decrease of the steering torque Ts, thus reducing load on the driver's biased steering. This therefore makes it possible to give a smoother steering feeling to the driver. If the absolute value |Ts| is higher than 0 and lower than the second threshold B (0<|Ts|<B), it is possible to decrease the intervening coefficient α in another form, such as a quadric form or a known form other than the linear form.

The dead zone according to the first embodiment is defined to, if the driver unintentionally touches the steering wheel 2, prevent the driver's unintentional touch to the steering wheel 2 from being erroneously detected as an intervening operation. The second zone is however not limited to the definition.

Specifically, the first threshold A established for the dead zone can be set without being limited for reducing such an erroneous detection. For example, in the fixed steering state, the value of the first threshold A can be set to be higher than the value used in the first embodiment. This setting of the first threshold A can prevent the intervening coefficient α decreasing even if there is torque whose magnitude is equivalent to a driver's gripping of the steering wheel 2. This modification prevents the steering torque Ts from being reduced, so that it is possible for the driver to recognize, from the steering torque Ts being applied to the steering wheel 2, that the vehicle VA is performing the automatic steering. That is, this modification enables the driver to determine whether the automatic steering is being performed in the fixed steering state.

The transformation map for calculating the intervening coefficient base αb from the steering torque Ts is identical to the first transformation map used in step S240 according to the first embodiment, but is not limited thereto. The transformation map for calculating the intervening coefficient base αb from the steering torque Ts is not limited to a single transformation map. Specifically, selectively switching one of plural transformation maps, which is similar to the process of selectively switching one of the first to fourth transformation maps according to the first embodiment, enables the intervening coefficient base αb to be calculated. In other words, selectively switching one of the plural transformation maps calculates the intervening coefficient base αb, and multiplying the intervening coefficient base αb with the adjustment coefficient k enables the intervening coefficient base αb to be obtained.

The gain transformation map, which is used to calculate a value of the previously prepared adjustment gain k using the steering torque Ts, is configured to output the adjustment gain k being 1 if the steering state quantity Qs is equal to or higher than zero. The gain transformation map, which is used to calculate a value of the previously prepared adjustment gain k using the steering torque Ts, is however not limited thereto.

For example, the gain transformation map can be configured such that the adjustment gain k decreases down to zero if the steering state quantity Qs increases to be equal to or higher than a biased-steering state threshold D that is a constant positive value. Reduction of the adjustment gain k while the steering state quantity Qs increases to be equal to or higher than the biased-steering state threshold D enables the intervening coefficient α to decrease, resulting in a decrease of the steering torque Ts. This makes it possible to reduce load on the driver who is performing the biased steering.

Figure 17:
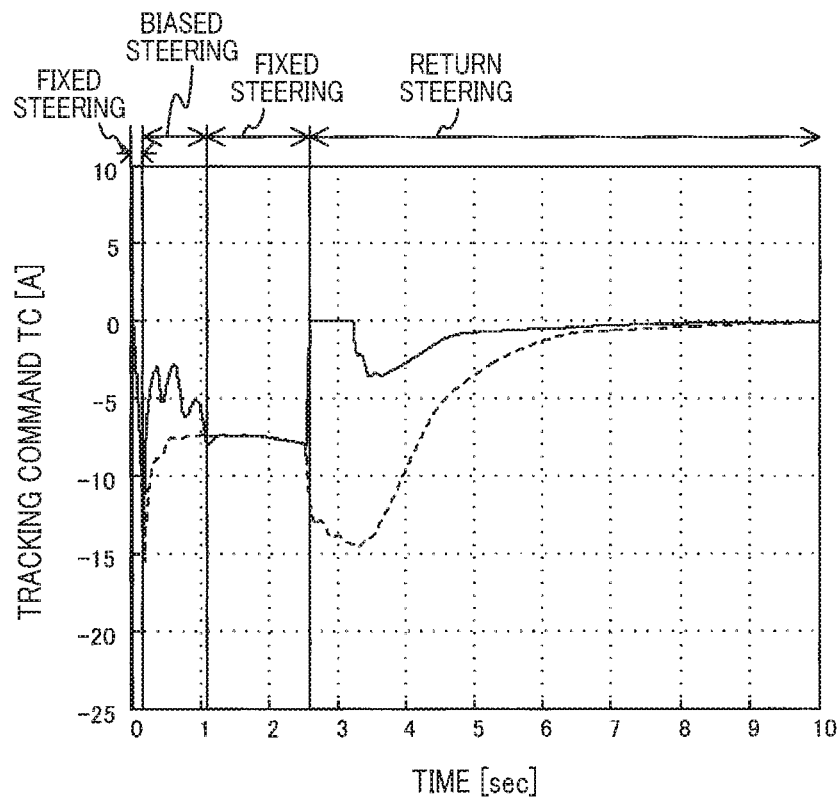
FIG. 17 is a graph illustrating change of the tracking command according to a further modification.
Figure 18:
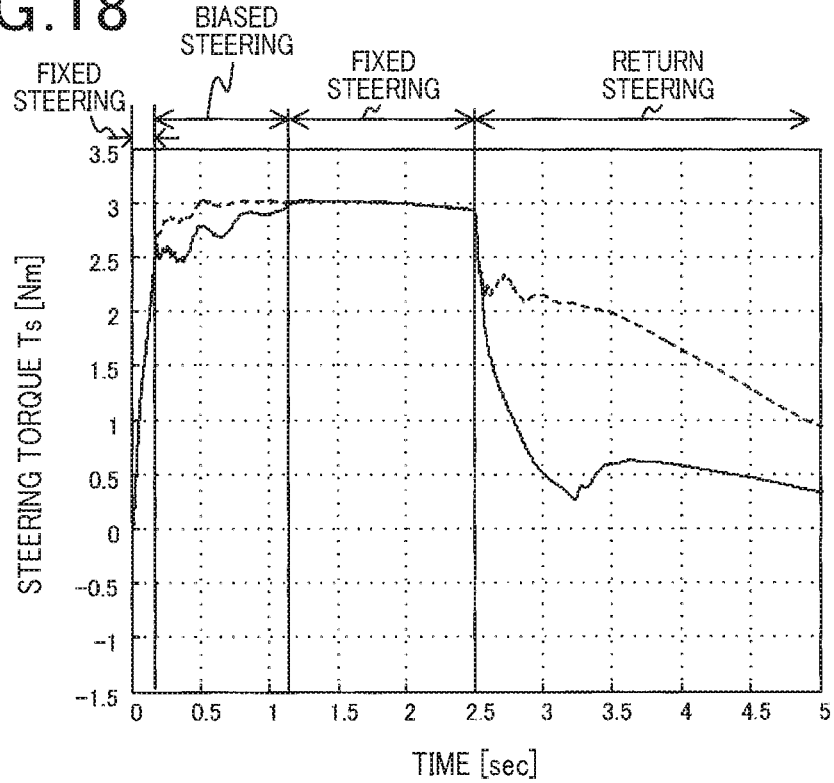
FIG. 18 is a graph illustrating the steering torque according to a still further modification.

Note that, in each of the following FIGS. 17 and 18, the results obtained based on the above conventional art are illustrated by dashed lines, and the results obtained based on the first embodiment are illustrated by solid lines.

The graph of FIG. 17 shows that the tracking command TC is larger in the driver's biased steering state, and therefore the graph of FIG. 18 shows that the steering state Ts is smaller in the driver's biased steering. This therefore demonstrates that burden on the driver who is performing the biased steering is reduced.

The steering torque Ts of each embodiment is not limited to a measurement value of the torque sensor 4, can be a steering-torque parameter that changes depending on the steering torque Ts. For example, a measurement value of the assist torque, load torque of the steering axis, rack thrust force, a command value for the assist torque, or a current command value can be used as the steering-torque parameter. The measurement value of the assist torque means a value calculated based on a measurement value, such as a current measurement value. The load torque or the rack thrust is a value estimated by calculation. The command value for the assist torque or the current command value is a target value or a command value resulted from control.

Each embodiment is configured to perform the state determination task using the motor angular velocity ω, but the present disclosure is not limited thereto. For example, it is possible to perform the state determination task in accordance with a steering speed, which is obtained by multiplying the motor angular velocity ω by the gear ratio, or another parameter changing depending on the steering speed.

Each embodiment determines that the driver's steering state is the fixed steering state upon determination that the absolute value of the motor angular velocity ω is equal to or lower than a predetermined threshold, but the determined steering state is not limited to the fixed steering state. For example, each embodiment can determine that the driver's steering state is stationary steering state upon determination that the absolute value of the motor angular velocity ω is equal to or lower than the predetermined threshold.

The tracking controller 30 according to each embodiment is configured to limit the tracking command TC in accordance with the intervening coefficient α representing the detection result of the intervention detector 40, but the present disclosure is not limited to the configuration.

For example, it is possible to use the structure that an intervening coefficient β, which is expressed by β=1−α, that is, a complementary value for the intervening coefficient α, is supplied to the assist controller 20. In this modification, it is sufficient that at least one of the supply of the intervening coefficient α to the tracking controller 30 and the supply of the intervening coefficient β to the assist controller 20 is performed. In this modification, the relationship between the intervening coefficient α and the intervening coefficient β cannot be limited to the above relationship, can be set to satisfy the relationship expressed by α+β≤1.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated. All aspects included in the technological ideas specified by the language employed by the claims constitute embodiments of the present disclosure.

The present disclosure can be implemented by various embodiments in addition to the state determination apparatus; the various embodiments include systems each including the state determination apparatus, programs for serving a computer as the state determination apparatus, storage media, such as non-transitory media, storing the programs, and state determination methods.

The invention claimed is:

1. A steering control apparatus comprising:
an assist controller configured to perform a first control task that generates an assist command for generating assist torque, the assist torque reducing a load of a driver's steering of a steering wheel installed in a vehicle;
a tracking controller configured to perform a second control task that generates a tracking command for generating automatic assist torque, the automatic assist torque causing a measurement value of a physical value associated with the steering to follow a target value for the physical value;
a motor driver configured to drive, based on the assist command and the tracking command, the motor to thereby generate the assist torque and the automatic steering torque;
a state determiner configured to determine whether a driver's steering state is a biased steering state or a return steering state, the biased steering state representing a state in which the driver applies a torque in a direction identical to a steering direction of the automatic steering, the return steering state representing a state in which the driver applies a torque in a direction opposite to the steering direction of the automatic steering, the state determiner determining whether the driver's steering state is the biased steering state or the return steering state in accordance with:
a first parameter associated with steering torque based on the driver's steering; and
a second parameter associated with an angular velocity of the motor; and
a ratio changer configured to change a ratio of the assist torque to the automatic steering torque in accordance with a determination result of the state determiner.

2. The steering control apparatus according to claim 1, further comprising:
an intervening unit configured to change, based on the determination result, a degree of intervening to the second control task by the tracking controller from the driver,
wherein the ratio changer is configured to change the ratio of the assist torque to the automatic steering torque in accordance with the degree of intervening.

3. The steering control apparatus according to claim 2, wherein:

the assist controller is configured to generate the assist command in accordance with a measurement value of steering torque generated by the driver's steering;

the state determiner is configured to determine at least whether the driver's steering state is the biased steering state or the return steering state using:

measurement torque that is a measurement value of the steering torque as the first parameter; and a measurement angular velocity that is a measurement value of an angular velocity of the motor; and the intervening calculator is configured to:

derive the degree of intervening using transformation information that defines a transformation characteristic from the measurement torque to the degree of intervening; and change the transformation information.

4. The steering control apparatus according to claim 3, wherein:

the intervening unit comprises, as the transformation information, a plurality of transformation maps that respectively have the transformation characteristics different from each other, the intervening unit being configured to selectively switch between the transformation maps in accordance with the determination result to thereby change the transformation characteristics.

5. The steering control apparatus according to claim 3, wherein:

the intervening unit is configured to multiply the degree of intervening derived based on the transformation information by an adjustment gain to thereby change the transformation characteristics, the adjustment gain being set in accordance with the determination result of the state determiner.

6. The steering control apparatus according to claim 5, wherein:

the steering control apparatus is configured to reduce the adjustment gain upon the driver's steering state is the biased steering state.

7. The steering control apparatus according to claim 1, wherein:

the assist controller is configured to generate the assist torque in accordance with a measurement value of steering torque generated by the driver's steering; and the state determiner is configured to determine at least whether the driver's steering state is the biased steering state or the return steering state using:

measurement torque that is a measurement value of the steering torque as the first parameter; and a measurement angular velocity that is a measurement value of an angular velocity of the motor.

8. The steering control apparatus according to claim 7, wherein:

the state determiner is configured to determine that the steering state is a hands-free steering state upon the measurement torque being lower than a predetermined torque threshold.

9. The steering control apparatus according to claim 7, wherein:

the state determiner is configured to determine, independently of a value of the measurement torque, that the steering state is a fixed steering state upon a magnitude of the measurement angular velocity being lower than a predetermined angular-velocity threshold.

10. The steering control apparatus according to claim 1, wherein:

the motor driver is configured to drive the motor in accordance with the sum of the assist command and the tracking command to thereby cause the motor to generate the assist torque and the automatic steering torque.

11. The steering control apparatus according to claim 1, wherein:

the ratio changer is configured to change, based on the determination result of the state determiner, an internal value to thereby change the ratio of the assist torque to the automatic steering torque, the internal value being used by at least one of the assist controller and the tracking controller.

* * * * *